(12) United States Patent
Straumann

(10) Patent No.: US 9,740,847 B2
(45) Date of Patent: Aug. 22, 2017

(54) METHOD AND SYSTEM FOR AUTHENTICATING A USER BY MEANS OF AN APPLICATION

(71) Applicant: Swisscom AG, Bern (CH)

(72) Inventor: Hugo Straumann, Obergosgen (CH)

(73) Assignee: SWISSCOM AG (CH)

( * ) Notice: Subject to any disclaimer, the term of this patent is extended or adjusted under 35 U.S.C. 154(b) by 0 days.

(21) Appl. No.: 15/200,464

(22) Filed: Jul. 1, 2016

(65) Prior Publication Data

US 2017/0032116 A1 Feb. 2, 2017

Related U.S. Application Data

(63) Continuation of application No. 14/705,383, filed on May 6, 2015, now Pat. No. 9,384,605, which is a continuation of application No. 13/679,580, filed on Nov. 16, 2012, now Pat. No. 9,047,497.

(30) Foreign Application Priority Data

Nov. 16, 2011 (CH) .............................. 2011CH-1829

(51) Int. Cl.
*G06K 5/00* (2006.01)
*G06F 21/35* (2013.01)
*G06K 19/07* (2006.01)
*G07C 9/00* (2006.01)

(52) U.S. Cl.
CPC ............... *G06F 21/35* (2013.01); *G06K 5/00* (2013.01); *G06K 19/0723* (2013.01); *G07C 9/00031* (2013.01); *G07C 9/00103* (2013.01); *G06F 2221/2115* (2013.01)

(58) Field of Classification Search
USPC ................................. 235/375, 380, 451, 492
See application file for complete search history.

(56) References Cited

U.S. PATENT DOCUMENTS

| 5,694,471 A | 12/1997 | Chen et al. |
| 7,496,193 B2 | 2/2009 | Nachef et al. |
| 7,925,892 B2 | 4/2011 | Przybilla |
| 8,744,936 B2 | 6/2014 | Guion et al. |
| 8,798,613 B2 | 8/2014 | MacNaughtan et al. |

(Continued)

*Primary Examiner* — Tuyen K Vo
(74) *Attorney, Agent, or Firm* — McAndrews, Held & Malloy, Ltd.

(57) ABSTRACT

Methods and systems are provided for authentication in electronic devices using multi-level security schemes. In an electronic device, at each particular level of a plurality of security levels of a multi-level security scheme, one or more identifiers associated with the particular level may be read from a user-specific card; and for each identifier of the one or more identifiers, associated data for use in validating the identifier may be read from the user-specific card. The identifier may then be authenticated within the electronic device, using the associated data; or may be forwarded, based on the associated data, to a particular remote server for verification of the identifier. Each identifier may comprise one of: user identifier, operator identifier, and application identifier. An application associated with each identifier may be identified, and the application may be executed after a positive authentication of the identifier.

16 Claims, 2 Drawing Sheets

(56) References Cited

U.S. PATENT DOCUMENTS

| | | | |
|---|---|---|---|
| 2004/0129787 A1* | 7/2004 | Saito | G06K 19/07 235/492 |
| 2005/0109837 A1 | 5/2005 | Van Overbeke et al. | |
| 2005/0207562 A1 | 9/2005 | Nachef et al. | |
| 2006/0280299 A1* | 12/2006 | Przybilla | G06Q 20/341 380/44 |
| 2007/0118758 A1 | 5/2007 | Takahashi et al. | |
| 2008/0180212 A1* | 7/2008 | Aikawa | G06F 21/32 340/5.83 |
| 2008/0313726 A1* | 12/2008 | Gardner | H04L 9/3273 726/9 |
| 2009/0320118 A1 | 12/2009 | Muller et al. | |
| 2010/0175120 A1 | 7/2010 | Tien | |
| 2010/0176935 A1 | 7/2010 | Phillips | |
| 2010/0188224 A1 | 7/2010 | Liu | |
| 2010/0277278 A1* | 11/2010 | Courouble | G06F 21/32 340/5.82 |
| 2011/0208658 A1* | 8/2011 | Makhotin | G06F 21/34 705/75 |
| 2012/0061465 A1* | 3/2012 | Luo | G06K 7/10237 235/380 |
| 2012/0066757 A1* | 3/2012 | Vysogorets | G06F 21/34 726/9 |
| 2012/0144461 A1* | 6/2012 | Rathbun | H04L 9/3213 726/5 |
| 2013/0019284 A1* | 1/2013 | Pacyga | H04L 67/02 726/4 |
| 2013/0212022 A1 | 8/2013 | Lanc | |

\* cited by examiner

METHOD AND SYSTEM FOR AUTHENTICATING A USER BY MEANS OF AN APPLICATION

CLAIM OF PRIORITY AND CROSS-REFERENCE TO RELATED APPLICATIONS/INCORPORATION BY REFERENCE

This application is a continuation of U.S. patent application Ser. No. 14/705,383 filed May 6, 2015, which is a continuation of U.S. patent application Ser. No. 13/679,580 filed Nov. 16, 2012, which in turn claims, pursuant to 35 U.S.C. §119, the filing date benefit of and right of priority to Swiss Patent Application no. 2011CH-1829 filed Nov. 16, 2011.

Each of the above identified applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

The invention relates to a method and a system for authenticating a user by an application.

BACKGROUND OF THE INVENTION

RFID (Radio-Frequency Identification) devices (e.g., badges, tags, and cards) are known in the state of the art, and can be used to authenticate a user vis-à-vis different services, and the user can subsequently avail himself or herself of these services. In order to guarantee the security of these cards, a sophisticated security concept is required. It is necessary to prevent a corrupt reader or provider from causing damages to the system in terms of security.

For the security of the RFID systems, proprietary systems are known that keep the keys and methods secret. Each application must adapt these. The card can, however, then be used only for one application. Unsecured methods are also known. Identification is performed through the unsecured UID, which provides no guarantee as to authenticity.

Another problem is that a user may have the difficulty of always carrying different cards and having them replaced in case of loss.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for authenticating a user using an application, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Aspects of the invention will be described in more detail on the basis of the attached figures, in which.

DETAILED DESCRIPTION OF THE INVENTION

Certain embodiments of the present invention may be found in a method and system for authenticating a user using an application, as described in the following in more detail with reference to the attached figures.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "exemplary" means serving as a non-limiting example, instance, or illustration. As utilized herein, the term "e.g.," introduces a list of one or more non-limiting examples, instances, or illustrations.

In various implementations of the invention, a card may be provided with which a user may be authenticated based on a user ID, where this user ID may be more fraud-resistant. In an implementation, an application on the card may be used, which application can read out and verify the user ID without the application being able to have access to other keys for other identities, or to a system key or to other application IDs. A method and a system utilizing the card and/or the application(s) may allow for operating both online and offline. In some instances, a particular security level, which may be implemented using the card as configured or used in accordance with the aspects of the invention, may be selected depending on the application. In an implementation, the card may allow for authenticating a user vis-à-vis a plurality of applications.

Figure 1:
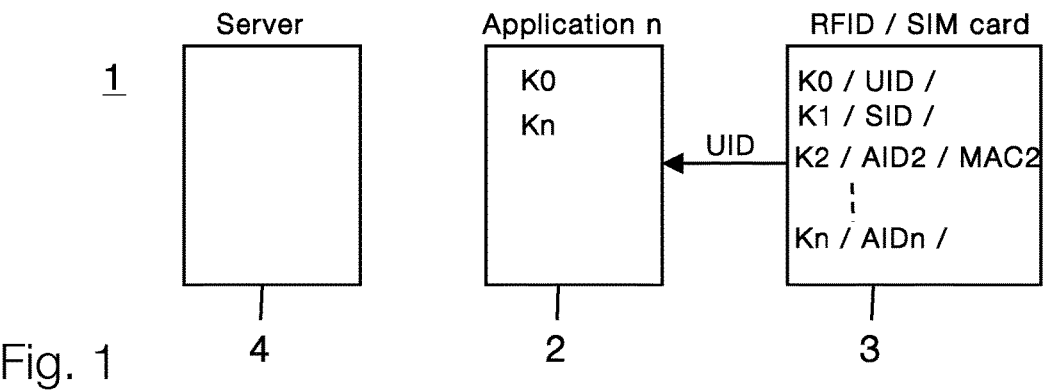
FIG. 1 illustrates a flowchart of a first security level, in accordance with an exemplary embodiment of the invention.

FIG. 1 illustrates a flowchart of a first security level, in accordance with an exemplary embodiment of the invention. Referring to FIG. 1 there is shown a system 1, which may comprise a server (4), a user-specific card (3), and an application n (2). In this regard, the application n (2) may be run in any suitable user device (not shown), such as a personal computer, a mobile phone, or any like device, which may be utilized in implementing various aspects of the present disclosure as described hereafter. The user-specific card (3) may comprise any suitable logic, circuitry, interfaces, and/or code for storing and/or providing particular data (e.g., identification related data). The server (4) may correspond to any suitable system or device (e.g., computer or the like), and may comprise any suitable logic, circuitry, interfaces, and/or code that may be operable to implement various aspects of the present disclosure as described hereafter.

As shown in FIG. 1 (and the remaining figures), a method may be implemented using the system 1 for authenticating a user, such as using the application n (2), card (3), and/or the server (4). In this regard, the embodiments of the FIGS. 1 to 3 each show a different level of security. The different levels of security may be selected and/or used (e.g., via the applications (2) or the server (4)) depending on requirements as to the desired security level. The user (not shown) may be in possession of the user-specific card (3). For example, the user-specific card (3) may comprise a RFID card, an RFID tag affixed onto the mobile radio unit, or an NFC (Near-Field Communication) application with a virtual card (with the key being located safely on a secure element, e.g., in the SIM card). Other form factors such as RFID bracelet, wristwatch, etc., and the like may also possible. The application n (2) may communicate with the card (3), such as over a contactless interface at close range, for example directly with the RFID element or with the mobile radio unit that is equipped with a software application (app) that performs the internal communication over the NFC interface with the SIM card.

The issuer of the card (3) may be referred to hereinafter as 'operator.' The operator may maintain the server (4), which may be used to guarantee the identification vis-à-vis the different applications (2). These applications (2) may be made available by, for example, external third parties and the user can select them and use them with the card (3). The user may register on the operator's server (4) and register one or more cards (3) that are provided with an RFID tag, such as for example a card, tag, bracelet, or wristwatch, and associate the different services and applications (2) selected by the user with these cards (3). In some instances, the user may obtain already registered cards directly or indirectly from the operator.

A user ID (UID), an operator ID (SID), and at least one application ID AIDn (n=2 to n, depending on the number of applications) may be stored on the card (3). Additionally, a key K0 associated with the user ID UID, a key K1 associated with the operator ID SID, and at least one key Kn (n=2 to n, depending on the number of applications) associated with the application ID AIDn may be stored on the card (3). Also, a particular value MAC0, MAC1, MAC2, . . . , MACn (Message Authentication Code) may be associated with each of these values, and may serve for the verification of the ID during readout for example.

The keys K0, . . . , Kn, IDs and MAC0, . . . , MACn may be written by, for example, a manufacturer onto cards (e.g., the card (3)), and may then be communicated (by the manufacturer) to the operator. The manufacturer may supply the cards, PIN and PUK (concealed) for activation thereof together with a file containing the card numbers, the card contents plus the PIN and PUK, to the operator, with the application values being encrypted with the user's Public Key. The cards may then be sold by the operator (and thus obtained by the user). The user (as the customer) may then register the card(s), such as over the Internet, on the server (4). In this regard, a card number, which may be printed on the card, and the PIN that has been made visible (e.g. by scratching off) may be used for the card registration. The customer may then subscribe to applications (2) according to personal preference.

Figure 3:
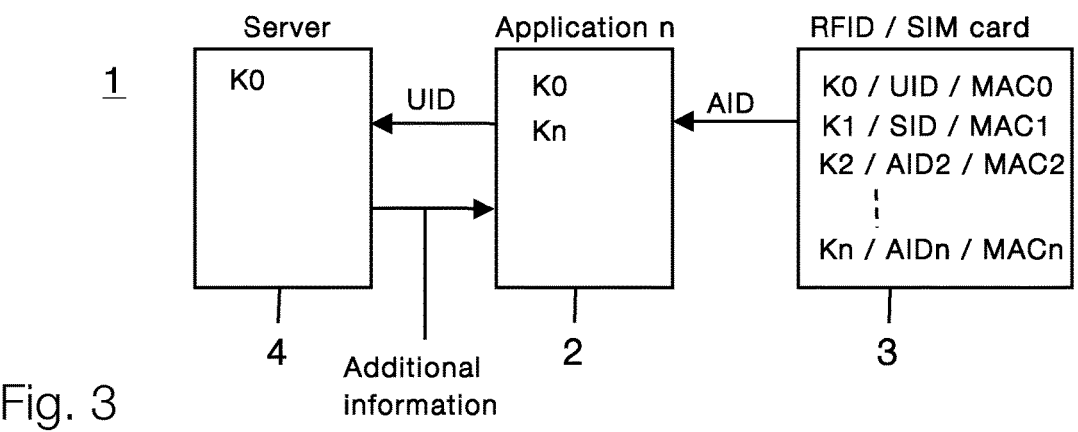
FIG. 3 illustrates a flowchart of a third security step, which may be performed to provide a third security level, in accordance with an exemplary embodiment of the invention.

The server (4) may send the information of the newly registered cards together with the card data to the applications (2). In some instances, cards that have been exchanged, lost or cancelled may also be registered. The application n (2) may also request the status information actually with identification (as shown in FIG. 3). Accordingly, each application n (2) (or the reader of the application) may need to know the key K0 in order to be capable of identifying the UID. Depending on the embodiment, each application may additionally know its own key (Kn), which is specifically associated with that application. The application key (Kn) may be securely exchanged at a given point in time with the server (4). The server (4) may contain the keys K0, K1 that are associated with the user UID and the operator SID.

In security level 1, as shown in FIG. 1, the UID may be read out and used by the application n (2), such as using an RFID reader for example, which can be both external as well as integrated in the application n (2), and of the card key K0. A handshake process may be used on the basis of the MAC0 stored on the card (3) for transmitting the data between the application n (2) and the card (3). In particular, the user UID and the MAC0 may be transmitted from the RFID/SIM card (3) to the application n (2). The application n (2) may generate the MAC0, such as based on the UID and/or the card key K0. On the basis of the generated MAC0 of the application n (2), the user UID can be verified by comparing the MAC0 transmitted by the RFID/SIM card (3) with the MAC0 generated in the application n (2). Accordingly, when done in this manner, it is difficult to eavesdrop on the transmission.

After a positive authentication of the user, further steps may be approved or performed. In case an unauthorized reader wishes to read out the card (3), the card may send a random UID and thus the user's privacy may be protected. The communication between the card (3) and the reader of the application may be protected according to appropriate standards.

The chip cards may be standardized with one or more of a plurality of norms. The following norms in particular can be used: ISO/IEC 14443, ISO/IEC 15693 (for the reading-out of chip cards), ISO/IEC 18000 (information technology—identification of goods by means of high frequency (RFID) for the management of the flow of goods) and EPCglobal (Electronic Product Code), ISO/IEC 15961 and ISO/IEC 15962 for determining parameters.

For example, the customer may go into a shop and instead of getting a ticket at the touch of a button on an automatic machine the customer may instead activate a number with the card (3). The customer will thus get the number supplied to the user device (e.g., mobile device) and can be advised personally in the shop since the customer identity is known. Depending on how much information is available about the user of the authenticated user UID, the authentication can in this example also be used to merely obtain a personal number that is required for example when queuing for services at a till, without in this case personal customer data being available.

Figure 2:
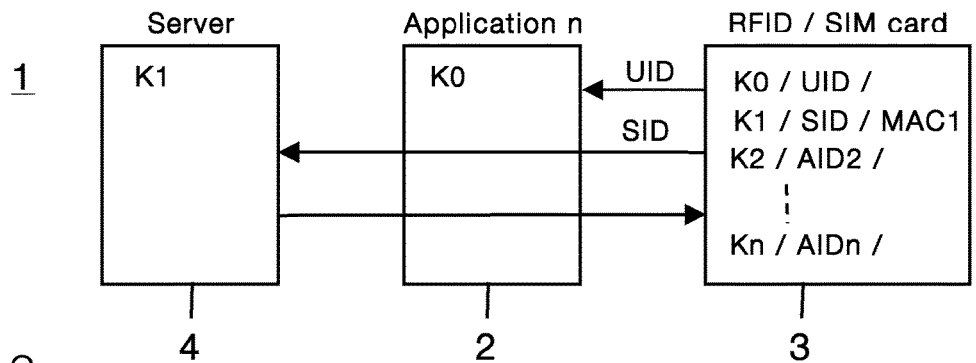
FIG. 2 illustrates a flowchart of a second security step, which may be performed to provide a second security level, in accordance with an exemplary embodiment of the invention.

FIG. 2 illustrates a flowchart of a second security step, which may be performed to provide a second security level, in accordance with an exemplary embodiment of the invention.

In security level 2, as shown in FIG. 2, the operator may (e.g., using a database) verify the operator ID SID, such as using or based on the operator key K1. For example, the reader of an application (e.g., the application n (2)) in this case may read out a field F1 (containing the server value, time stamp, MAC_server), and may then send the SID together with F1 to the operator (server (4)). The reader of the application in doing so may work transparently. The server (4) may verify the MAC1, which it computes by using the SID and the key K1. The server (4) then computes a new value for the MAC1, sends the entire new field to the reader and the latter stores the new value of MAC1 in the card (3) for the next verification. A challenge-response method can also be used. The communication between the card (3) and the reader of the application may be protected according to appropriate standards. The communication between the reader and the server (4) may be protected according to appropriate encryption mechanisms.

The method corresponding to the second security level can be performed as long as there is a connection between the application n (2) and the server (4). In this embodiment, both the user ID UID and the operator ID SID may be authenticated, although the UID can be authenticated by the application n (2). The SID by contrast may be authenticated by the server (4), and the result of the authentication process is communicated to the application n (2).

For example, the customer may go to a shop that sells products of the card provider (partner shop). The reader may not be in a secure network since the application is not under the control of the operator. The customer may, however, avail himself or herself of a voucher or of a reduction in the partner shop through the card. The card (3) can thus be verified in accordance with the second security level based mechanism, such as directly using the server (4). It is thus possible to credit the voucher to the customer without it being possible for the partner shop to misuse the system.

FIG. 3 illustrates a flowchart of a third security step, which may be performed to provide a third security level, in accordance with an exemplary embodiment of the invention.

In security level 3, as shown in FIG. 3, the application n (2) may read out the application identifier AIDn, using the application key Kn for example. The AIDn may be verified, such as using the MACn for the relevant application for example. In this regard, a field Fn can be read and written only by the associated application. A challenge-response method can also be used. Subsequently, the application n (2) may request additional information from the server (4) by using the user ID UID. The server (4) may send corresponding additional information to the application n (2) (e.g. customer address, age, status of the card (3), etc.)

For example, the customer may purchase a particular service (e.g., a cinema subscription). The customer may then go to the cinema and obtain the cinema ticket using the card (3). The card (3) may be verified by the cinema application and the age is verified on the server and communicated to the cinema application.

Figure 4:
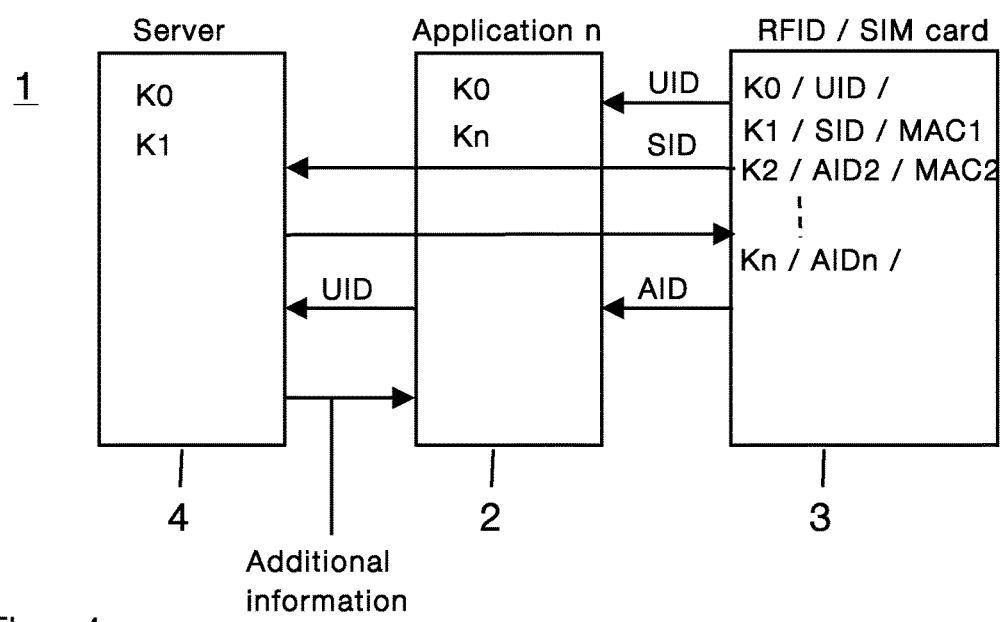
FIG. 4 illustrates a flowchart of a combination of three security steps or levels, in accordance with an exemplary embodiment of the invention.

FIG. 4 illustrates a flowchart of a combination of three security steps or levels, in accordance with an exemplary embodiment of the invention. In this regard, in some instances a combination of the three security levels (as described with respect to FIGS. 1 to 3) may be used, such as depending on the particular embodiment and security level.

Accordingly, multiple diverse applications (2) may use the card (3) for authentication. The user therefore does not need to own different cards (3). In case of loss, a card (3) can be blocked and replaced. The authentication data may not be lost when the card (3) is blocked or replaced since merely key information is stored on the card (3) (e.g., UID, SID, AIDn, and associated MACs and keys). The applications (2) are, by virtue of their own key, independent.

Aspects of the invention may be implemented using a system (e.g., the system 1), comprising a user-specific card (3), which may store identification related data, such as a user ID UID, an operator ID SID and at least one application ID (AIDn). In particular, the user-specific card can comprise a card key (K0) associated with the user ID (UID), a key (K1) associated with the operator ID (SID) and at least one application ID (AIDn) with an associated application key (Kn) each.

In some instances, the card may be initialized. For example, the card manufacturer may initialize corresponding fields by transmitting onto the card (3) the user ID UID, the operator ID SID, and the application IDs AIDn, as well as the associated keys K0, K1, . . . Kn. For each card, a PIN (Personal Identification Number) and PUK (Personal Unblocking Key) may be defined for the activation. The card data may be entered into the server (4). When the customer acquires a card, the PIN and PUK may be supplied and concealed with the card (3). The customer may then register, such as over the Internet, onto the server (4) as owner of the card (3). For this, the number printed on the card as well as the PIN that has been rendered visible (e.g. by scratching) may be needed. The customer can define user-specific applications associated with the card in the server (4). The server (4) may send the information of the newly registered card (3), together with the card data, to the applications (2). In some instances, cards (3) that have been exchanged, lost or terminated, can also be notified to the application (2).

The application (2) may be configured and/or operable (e.g., autonomously and/or by use of necessary hardware or software means) for reading out an ID, for example UID, SID, AIDn, of the card (3); verifying the ID, for example UID, AIDn; forwarding the ID (UID, SID) to the server (4); and receiving the answer from the server (4). The application (2) in this respect comprises in particular the card key (K0) and the associated application key (Kn), and the server (4) comprises the card key (K0) and the operator key (K1).

The server (4) may comprise any suitable logic, circuitry, interfaces, and/or code for receiving an ID (UID, SID) from the application n (2); for verifying the received ID SID; for sending the result to the application n (2) as well as for sending user information to the application n (2), wherein the application n (2) and the server (4) are connected, e.g. over a network.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, aspects of the present invention may be realized in hardware, software, or a combination of hardware and software. Aspects of the present invention may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While aspects of the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

LIST OF REFERENCE SIGNS

1 System
2 Application
3 RFID element
4 Server
UID User ID
SID Operator ID
AIDn Application ID of the application n
K0 Card key
K1 Operator key
K2 . . . n Application key
MAC0 Message Authentication Code for UID
MAC1 Message Authentication Code for SID
MAC2 . . . n Message Authentication Code for AID2 . . . n

What is claimed is:

1. A method comprising:
in an electronic device, at each one of a plurality of security levels of a multi-level security scheme:
reading from a user-specific card, one or more corresponding identifiers;
reading from said user-specific card, for each identifier of said one or more corresponding identifiers, associated data for use in validating said identifier;
for each identifier of said one or more corresponding identifiers:
authenticating said identifier within said electronic device using said associated data; or
forwarding said identifier based on said associated data to a remote server for verification of said identifier; and
when said identifier comprises an application identifier:
verifying said application identifier;
reading out from said user-specific card a second identifier, wherein said second identifier comprises a user identifier; and
sending said user identifier to said remote server in order to request additional information for said user before executing a particular application associated with said application identifier.

2. The method of claim 1, wherein said identifier comprises one of: user identifier, operator identifier, and application identifier.

3. The method of claim 1, wherein said user-specific card comprises an radio-frequency identification (RFID) element or a subscriber identification module (SIM) card.

4. The method of claim 1, wherein said remote server comprises information relating to registration of a plurality of user-specific cards.

5. The method of claim 1, comprising reading out data from said user-specific card via a contactless interface.

6. The method of claim 1, comprising:
identifying an application associated with said identifier; and
executing said application after a positive authentication of said identifier.

7. The method of claim 1, comprising, when said identifier comprises a user identifier, sending said user identifier to said remote server, after authenticating of said user identifier.

8. The method of claim 7, comprising receiving from said remote server, in response to reception of said user identifier, additional information associated with said user.

9. A system, comprising:
an electronic device configured to implement a multi-level security scheme, wherein said electronic device is operable to, at each one of a plurality of security levels of said multi-level security scheme:
read from a user-specific card, one or more corresponding identifiers;
read from said user-specific card, for each identifier of said one or more corresponding identifiers, associated data for use in validating said identifier;
for each identifier of said one or more corresponding identifiers:
authenticate said identifier using said associated data; or
forward said identifier based on said associated data to a remote server for verification of said identifier; and
when said identifier comprises an application identifier:
authenticate said application identifier;
read out from said user-specific card a second identifier, wherein said second identifier comprises a user identifier; and
send said user identifier to said remote server in order to request additional information for said user before executing a particular application associated with said application identifier.

10. The system of claim 9, wherein said identifier comprises one of: user identifier, operator identifier, and application identifier.

11. The system of claim 9, wherein said remote server comprises information relating to registration of a plurality of user-specific cards.

12. The system of claim 9, wherein said user-specific card comprises an radio-frequency identification (RFID) element or a subscriber identification module (SIM) card.

13. The system of claim 9, wherein said electronic device is operable to read out data from said user-specific card via a contactless interface.

14. The system of claim 9, wherein said electronic device is operable to:
identify an application associated with said identifier; and
execute said application after a positive authentication of said identifier.

15. The system of claim 9, wherein said electronic device is operable to, when said identifier comprises a user identifier, send said user identifier to said remote server, after authenticating of said user identifier.

16. The system of claim 15, wherein said electronic device is operable to receive from said remote server, in response to sending said user identifier, additional information associated with said user.

* * * * *